United States Patent
Friedman

(10) Patent No.: US 8,890,743 B2
(45) Date of Patent: *Nov. 18, 2014

(54) PROXY REMOTE CONTROL

(71) Applicant: AT&T Intellectual Property I, L.P., Atlanta, GA (US)

(72) Inventor: Lee Friedman, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 239 days.

This patent is subject to a terminal disclaimer.

(21) Appl. No.: 13/632,541

(22) Filed: Oct. 1, 2012

(65) Prior Publication Data
US 2013/0053985 A1 Feb. 28, 2013

Related U.S. Application Data

(63) Continuation of application No. 12/638,431, filed on Dec. 15, 2009, now Pat. No. 8,299,954.

(51) Int. Cl.
| | |
|---|---|
| G08C 19/12 | (2006.01) |
| H04N 21/41 | (2011.01) |
| H04N 5/44 | (2011.01) |
| H04N 21/422 | (2011.01) |
| H04N 21/4147 | (2011.01) |

(52) U.S. Cl.
CPC .......... *H04N 5/4403* (2013.01); *G08C 2201/90* (2013.01); *H04N 21/42207* (2013.01); *H04N 21/4135* (2013.01); *H04N 21/4147* (2013.01)
USPC ......................... 341/176; 340/12.22; 348/734

(58) Field of Classification Search
USPC ............. 341/176; 340/12.22, 825.69, 825.72; 348/734
See application file for complete search history.

(56) References Cited

U.S. PATENT DOCUMENTS

| | | |
|---|---|---|
| 4,864,647 A | 9/1989 | Harrington |
| 6,349,352 B1 | 2/2002 | Lea |
| 6,469,633 B1 | 10/2002 | Wachter |
| 7,006,881 B1 | 2/2006 | Hoffberg et al. |
| 7,126,468 B2 | 10/2006 | Arling et al. |
| 7,589,642 B1 | 9/2009 | Mui |
| 7,969,513 B1 | 6/2011 | Weber |
| 2004/0203387 A1 | 10/2004 | Grannan |
| 2004/0203590 A1 | 10/2004 | Shteyn |
| 2005/0099220 A1 | 5/2005 | Sato |
| 2006/0259184 A1 | 11/2006 | Hayes et al. |
| 2007/0136768 A1 | 6/2007 | Kumar |
| 2008/0094245 A1 | 4/2008 | Hardacker et al. |
| 2011/0140948 A1 | 6/2011 | Friedman |
| 2011/0142422 A1* | 6/2011 | Friedman ...................... 386/297 |
| 2011/0219419 A1 | 9/2011 | Reisman |
| 2012/0021684 A1* | 1/2012 | Schultz et al. ............... 455/41.1 |

OTHER PUBLICATIONS

Notice of Allowance for U.S. Appl. No. 12/638,431 mailed Jun. 29, 2012, 17 pages.

* cited by examiner

*Primary Examiner* — Howard Williams
(74) *Attorney, Agent, or Firm* — Toler Law Group, PC

(57) ABSTRACT

A method includes receiving first control data at a proxy controller from a proxy remote control signal receiver device. The first control data is associated with execution of a first action at a first device. The method includes determining second control data at the proxy controller. The second control data is associated with execution of a second action at the first device. The second action is at least one of different from, or additional to, and based upon the first action. The method includes communicating the second control data to the proxy remote control signal receiver device. The proxy remote control signal receiver device is configured to communicate the second control data to the first device.

20 Claims, 6 Drawing Sheets

PROXY REMOTE CONTROL

CLAIM OF PRIORITY

This application is a continuation of and claim priority from U.S. patent application Ser. No. 12/638,431 filed on Dec. 15, 2009 and entitled "PROXY REMOTE CONTROL", the contents of which are incorporated herein in their entirety.

FIELD OF THE DISCLOSURE

The present disclosure is generally related to proxy remote control of one or more devices.

BACKGROUND

A remote control device is usually associated with a single device. When a user selects a particular remote control command, an action associated with the selected command is performed by the associated device. Universal remote controls may be able to control multiple types of devices. However, complex actions are typically difficult to execute using standard remote control commands. For example, standard remote control commands may be unable to execute related actions at multiple devices simultaneously.

DETAILED DESCRIPTION

Figure 1:
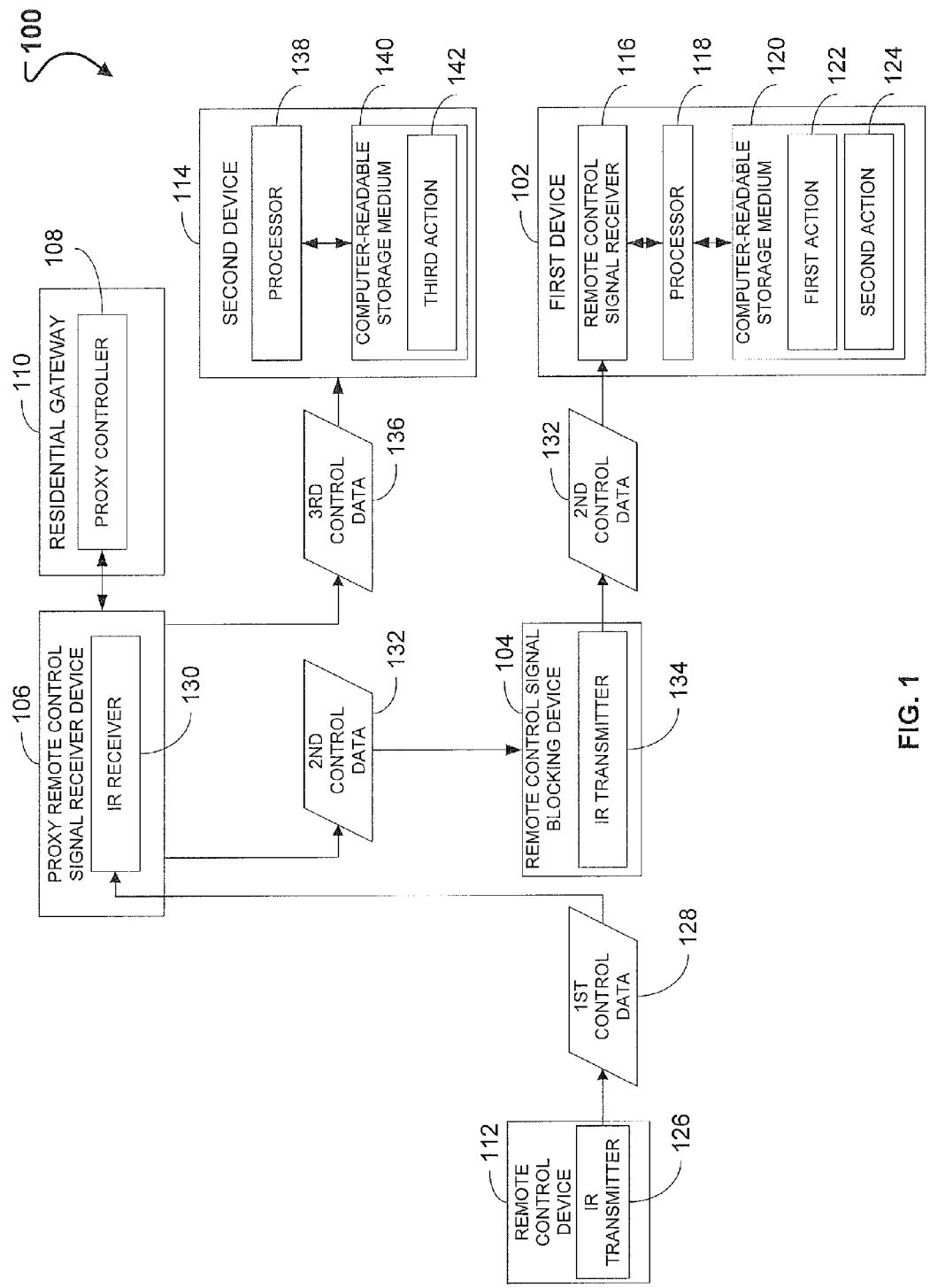
FIG. 1 is a block diagram of a first illustrative embodiment of a proxy remote control system.

The present disclosure relates to proxy remote control of devices. The present disclosure may allow for proxy remote control of a device associated with a remote control and proxy remote control of other devices that are not associated with the remote control. A remote control signal blocking device prevents the device associated with the remote control from receiving control data from the remote control. For example, the remote control may communicate the control data to the device via an infrared transmission, and the remote control signal blocking device may block an infrared receiver of the device. A proxy remote control signal receiver device intercepts the control data and provides alternative control data to the device. Further, the proxy remote control signal receiver device may convert the control data received from the remote control into alternative control data for use by a separate device.

In a particular embodiment, a computer-implemented method is disclosed. The method includes receiving, at a proxy remote control signal receiver device, first control data from a remote control device that is associated with a first device. The first control data is prevented from being received at a remote control signal receiver associated with the first device, and the first control data is associated with execution of a first action at the first device. For example, the first control data may be an infrared transmission of a first remote control key sequence from a remote control device associated with a set-top box device, and the first remote control key sequence is prevented from being received at an infrared remote control signal receiver of the set-top box device. The method includes communicating the first control data from the proxy remote control signal receiver device to a proxy controller and receiving second control data from the proxy controller. The second control data is associated with execution of a second action at the first device that is different from the first action. For example, the second control data may be a second remote control key sequence associated with execution of a second action at the set-top box device. The second control data is communicated to the first device via the proxy remote control signal receiver device.

In another embodiment, a computer-readable storage medium is disclosed that includes instructions that, when executed by a processor, cause the processor to receive first control data from a remote control device that is associated with a first device. The first control data is prevented from being received at a remote control signal receiver associated with the first device. The first control data is associated with execution of a first action at the first device. The instructions further cause the processor to determine second control data based on the first control data, where the second control data is associated with execution of a second action at the first device that is different from the first action. The instructions further cause the processor to determine third control data based on the first control data, where the third control data is associated with execution of a third action at a second device that is different from the first device, where the third action is different from the first action. The instructions further cause the processor to communicate the second control data to the first device, where the second control data is executable by the first device to perform the second action at the first device. The instructions further cause the processor to communicate the third control data to the second device, where the third control data is executable by the second device to perform the third action at the second device.

For example, the first device may include a set-top box device that includes an internal digital video recorder (DVR), and the second device may include an external DVR that is separate from the set-top box device. In this case, the second action may include recording a multimedia content item at the internal DVR of the set-top device, and the third action may include separately recording the same multimedia content item at the external DVR in order to synchronize the content recorded at the internal DVR and the external DVR. For example, the external DVR may allow a user to play back multimedia content on one or more portable devices. Typically, when the user initiates a recording using a set-top box remote, the internal DVR records a selected multimedia content item, but the selection is not communicated to the external DVR. This may result in multimedia content recorded at the internal DVR being out of sync with the multimedia content recorded at the external DVR. The proxy remote control system of the present disclosure may be used to keep an internal DVR and an external DVR synchronized. By instructing both DVRs to record the same content, the time consuming task of manually synchronizing recorded multimedia content between the set-top box device and other devices (e.g., a portable device including a DVR) may be avoided. Further, the user does not have to remember to synchronize the content between devices.

As another example, the first device may include a set-top box device, and the second device may include a television or a stereo receiver. In this case, the second action may include automatically adjusting the volume of the television, the stereo receiver, or both. As a further example, the first device may include a television, and the second device may include a gaming device. In this case, the second action may include automatically turning on the gaming device when a gaming input is selected at the television.

In another embodiment, a system is disclosed that includes a first device with a remote control signal receiver that is operable to receive control data from a remote control device. The system also includes a remote control signal blocking device that is operable to prevent first control data that is transmitted from the remote control device from being received at the remote control signal receiver of the first device. The first control data is associated with execution of a first action at the first device. The system also includes a proxy remote control signal receiver device that is operable to receive the first control data that is transmitted from the remote control device and to communicate the first control data to a proxy controller. The proxy remote control signal receiver device is further operable to receive second control data from the proxy controller that is associated with execution of a second action at the first device that is different from the first action. The proxy remote control signal receiver device is further operable to communicate the second control data to the first device via the remote control signal blocking device. For example, the remote control signal blocking device may include an infrared transmitter, and the second control data may be transmitted to the first device via an infrared transmission. The first device executes the second action in response to receiving the second control data from the remote control signal blocking device. For example, the first control data may be associated with changing to a first channel, and the second control data may be associated with changing to a second channel. As an example, the first channel may be a standard definition version of multimedia content, and the second channel may be a high definition version of the same multimedia content. Thus, the proxy controller may infer that a user with a high definition television would prefer to watch the multimedia content in the high definition format when the format is available.

Referring to FIG. 1, a first illustrative embodiment of a proxy remote control system is illustrated, at 100. The system 100 includes a first device 102, a remote control signal blocking device 104, a proxy remote control signal receiver device 106, and a proxy controller 108. In the embodiment illustrated in FIG. 1, the proxy controller 108 is separate from the first device 102 and is included within a residential gateway 110 at a customer premises associated with the first device 102. In alternative embodiments, the proxy controller 108 may be included within the first device 102. The remote control signal blocking device 104 prevents remote control data transmitted from a remote control device 112 associated with the first device 102 from being received at the first device 102. By preventing the first device 102 from receiving control data from the remote control device 112, alternative control data retrieved from the proxy controller 108 may be provided to the first device 102 via the proxy remote control signal receiver device 106. In the embodiment illustrated in FIG. 1, a second device 114 is shown. The proxy remote control signal receiver device 106 may retrieve data from the proxy controller 108 that is associated with execution of an action at the second device 114. Thus, the system 100 of FIG. 1 may allow for proxy remote control of one or more devices via the remote control device 112. A remote control key sequence received at the proxy remote control signal receiver device 106 may be used to execute alternative actions at the device associated with the remote control device 112 (e.g., the first device 102) and to execute actions at another device that is not associated with the remote control device 112 (e.g., the second device 114).

The first device 102 includes a remote control signal receiver 116, a processor 118, and a computer-readable storage medium 120. In the embodiment illustrated in FIG. 1, multiple actions, such as a first action 122 and a second action 124, may be executed by the processor 118. In alternative embodiments, the computer-readable storage medium 120 may store instructions associated with any number of processor executable actions. The remote control signal receiver 116 is operable to receive control data from the remote control device 112. For example, the remote control signal receiver 116 may include an infrared (IR) receiver adapted to receive IR signals transmitted by an IR transmitter 126 of the remote control device 112. The remote control signal blocking device 104 prevents this control data (e.g., IR transmissions) from being received at the remote control signal receiver 116 of the first device 102. For example, in FIG. 1, the IR transmitter 126 of the remote control device 112 may transmit first control data 128 via an IR transmission, and the remote control signal blocking device 104 may prevent the first control data 128 from being received at the remote control signal receiver 116 by physically blocking the remote control signal receiver 116. For example, the remote control signal blocking device 104 may be made of an opaque material and may be positioned in front of the remote control signal receiver 116 to physically block IR signals transmitted from the remote control device 112. The first control data 128 may be associated with execution of the first action 122. In alternative embodiments, the remote control signal receiver 116 may include a radio frequency (RF) receiver adapted to receive RF signals from an RF transmitter (not shown) of the remote control device 112. In this case, the remote control signal blocking device 104 may prevent this control data (e.g., RF transmissions) from being received at the remote control signal receiver 116 of the first device 102 by scrambling or otherwise blocking the RF transmissions.

The proxy remote control signal receiver device 106 is operable to receive the first control data 128 that is transmitted from the remote control device 112. For example, the proxy remote control signal receiver device 106 may include an IR receiver 130 adapted to receive IR signals from the IR transmitter 126 of the remote control device 112. The proxy remote control signal receiver device 106 is operable to communicate the first control data 128 to the proxy controller 108.

The proxy controller 108 is operable to determine second control data 132 based on the first control data 128. The second control data 132 is associated with execution of the second action 124 at the first device 102. The second action 124 is different from the first action 122. The second control data 132 is communicated from the proxy remote control signal receiver device 106 to the first device 102. In the embodiment illustrated, the second control data 132 is transmitted to the first device 102 via an IR transmitter 134 of the remote control signal blocking device 104. In response to receiving the second control data 132, the first device 102 performs the second action 124. Thus, the proxy controller 108 is operable to translate the first control data 128 into the second control data 132, resulting in the execution of an action (e.g., the second action 124) that is different from the action (e.g., the first action 122) associated with the first control data 128 transmitted from the remote control device 112. As one example, the first control data 128 may be associated with changing to a first channel, and the second control data 132 may be associated with changing to a second channel. As an example, the first channel may be a standard definition version of multimedia content, and the second channel may be a high definition version of the same multimedia content. As another example, the first control data 128 may be associated with a request to record a standard definition version of multimedia content, and the second control data 132 may be associated with a request to record a high definition version of the same multimedia content. Thus, the proxy controller 108 may infer that when the first device 102 is a high definition television, a user would prefer to watch the multimedia content in the high definition format when this format is available.

The proxy controller 108 is further operable to determine third control data 136 based on the first control data 128. The third control data 136 is associated with execution of another action at the second device 114. The second device 114 includes a processor 138 and a computer-readable storage medium 140. In the embodiment illustrated in FIG. 1, a third action 142 may be executed by the processor 138. In alternative embodiments, the computer-readable storage medium 140 may store instructions associated with any number of processor executable actions. In the embodiment illustrated, the third control data 136 is associated with execution of the third action 142. The third action 142 may be different from the first action 122. The third control data 136 is communicated from the proxy remote control signal receiver device 106 to the second device 114. Thus, in the embodiment illustrated in FIG. 1, the proxy controller 108 is further operable to translate the first control data 128 into the third control data 136 for execution by a device (e.g., the second device 114) that is not associated with the remote control device 112.

In operation, the IR transmitter 126 of the remote control device 112 transmits the first control data 128 as a first infrared signal. The remote control signal blocking device 104 prevents the first infrared signal from being received at the first device 102. For example, the remote control signal receiver 116 of the first device 102 may include an IR interface to receive IR signals from the remote control device 112, and the remote control signal blocking device 104 may include a mask that covers the IR interface. In the case of infrared signal transmissions, preventing the remote control signal receiver 116 of the first device 102 from receiving IR signals may be accomplished by physically blocking the IR interface. By preventing the first control data 128 from reaching the first device 102, the remote control signal blocking device 104 prevents the first action 122 from being executed by the first device 102. Instead, the first infrared signal including the first control data 128 is received at the IR receiver 130 of the proxy remote control signal receiver device 106.

The proxy remote control signal receiver device 106 communicates the first control data 128 to the proxy controller 108. In the embodiment illustrated, the proxy controller 108 is stored at the residential gateway 110 associated with a customer premises of the first device 102. The first control data 128 may be communicated to the residential gateway 110 via a wired connection or via a wireless connection. For example, the wired connection may include an Ethernet connection, and the wireless connection may include an 802.11x connection. Alternatively, the proxy remote control signal receiver device 106 may be included within the residential gateway 110. In another embodiment, the proxy controller 108 may not be stored locally at the customer premises. In this case, the proxy controller 108 may be accessible via a network connection (see FIG. 2 for an example of a remotely located proxy controller).

The proxy controller 108 determines the second control data 132 based on the first control data 128. For example, if the first control data 128 is associated with a particular channel, the proxy controller 108 may determine the second control data 128 based on the channel. The second control data 132 is associated with execution of the second action 124 at the first device 102. In one embodiment, the second control data 132 is determined based on historical data that includes a log of remote control key sequences received from the remote control device 112. For example, the first control data 128 may include a first remote control key sequence and the second control data 132 may include a second remote control key sequence that is determined based on the log of remote control key sequences. The log of remote control key sequences may indicate that the first remote control key sequence is associated with a subsequent corrected key sequence. For example, a user may be provided a limited amount of time to enter a channel number before the channel number is transmitted to the first device 102 (e.g., a timeout period). The log may indicate that the user often enters a first channel number (e.g., 1 or 11) followed by a second channel number (e.g., 111 or 1111). This may indicate that the user intended to enter a multi-digit channel number (e.g., 111 or 1111) but the timeout period expired before all the digits could be entered. Thus, when the first control data 128 includes a first key sequence (e.g., 11), the proxy controller 108 may substitute a second key sequence (e.g., 1111) based on the log.

In one embodiment, the proxy controller 108 of the residential gateway 110 may communicate the remote control key sequences received at the proxy remote control receiver device 106 to a network location. As such, the log of remote control key sequences used by the proxy controller 108 may be a log of key sequences received from only the remote control device 112 associated with the customer premises, or the log of remote control key sequences may be a log of key sequences received from multiple remote control devices associated with other customer premises. Collecting remote control key sequences from multiple users at multiple locations may allow a network provider to monitor customer viewing habits and to update the proxy controller 108 based on information received from multiple users.

The proxy remote control signal receiver device 106 receives the second control data 132 from the proxy controller 108 and communicates the second control data 132 to the first device 102. In the embodiment illustrated, the second control data 132 is communicated to the first device 102 via the remote control signal blocking device 104. In this embodiment, the IR transmitter 134 of the remote control signal blocking device 104 transmits a second IR signal to the remote control signal receiver 116 of the first device 102 (i.e., an IR signal that is different from the first IR signal transmitted by the IR transmitter 126 of the remote control device 112). Thus, in this embodiment, one side of the remote control signal blocking device 104 masks IR signals from the remote control device 112 while the other side includes the IR transmitter 134 that is aligned with an IR receiver of the first device 102. In a particular embodiment, the first device 102 includes a set-top box device with at least one Universal Serial Bus (USB) interface, the remote control signal blocking device 104 includes a USB transmitter powered by the set-top box device, and the proxy remote control signal receiver device 106 includes a USB receiver powered by the set-top box device. In alternative embodiments, the second control data 132 may be communicated from the proxy remote control signal receiver device 106 to the first device 102 via a wired or wireless connection. In response to receiving the second control data 132, the first device 102 performs the second action 124.

In the embodiment illustrated in FIG. 1, the proxy controller 108 determines the third control data 136 based on the first control data 128. The third control data 136 is associated with execution of the third action 142 at the second device 114. For example, the first device 102 may include a set-top box device and the second device 114 may include an external digital video recorder that is separate from the set-top box device. In this case, the second action 124 may include recording a multimedia content item at an internal DVR of the set-top box device (e.g., a DVR associated with the computer-readable storage medium 120 of the first device 102), and the third action 142 may include recording the same multimedia content item at the external DVR (e.g., a DVR associated the computer-readable storage medium 140 second device 114). Thus, the same multimedia content item may be recorded at both the first device 102 and the second device 114 in response to a single request from the remote control device (e.g., the first control data 128). In this way, recorded content may be automatically synchronized between multiple devices. The second action 124 and the third action 142 may occur at the same time or may occur at different times. Alternatively, the third action 142 may be performed without performing the second action 124. For example, the proxy controller 108 may determine that the first device 102 is normally inactive during a particular period of time, while the second device 114 is normally active during the same period of time. In this case, it may be desirable to only record the multimedia content at the device that is normally active (e.g., the second device 114).

The proxy remote control signal receiver device 106 receives the third control data 136 from the proxy controller 108 and communicates the third control data 136 to the second device 114. The second control data 132 may be communicated from the proxy remote control signal receiver device 106 to the second device 114 via a wired or wireless connection. In response to receiving the third control data 136, the second device 114 performs the third action 142.

Thus, the system 100 of FIG. 1 may allow for proxy remote control of multiple devices (e.g., the first device 102 and the second device 114) via a single remote control device (e.g., the remote control device 112). A remote control key sequence received at the proxy remote control signal receiver device 106 may be used to execute alternative actions at the device associated with the remote control device 112 (e.g., the first device 102) and to execute actions at another device that is not associated with the remote control device 112 (e.g., the second device 114).

Figure 2:
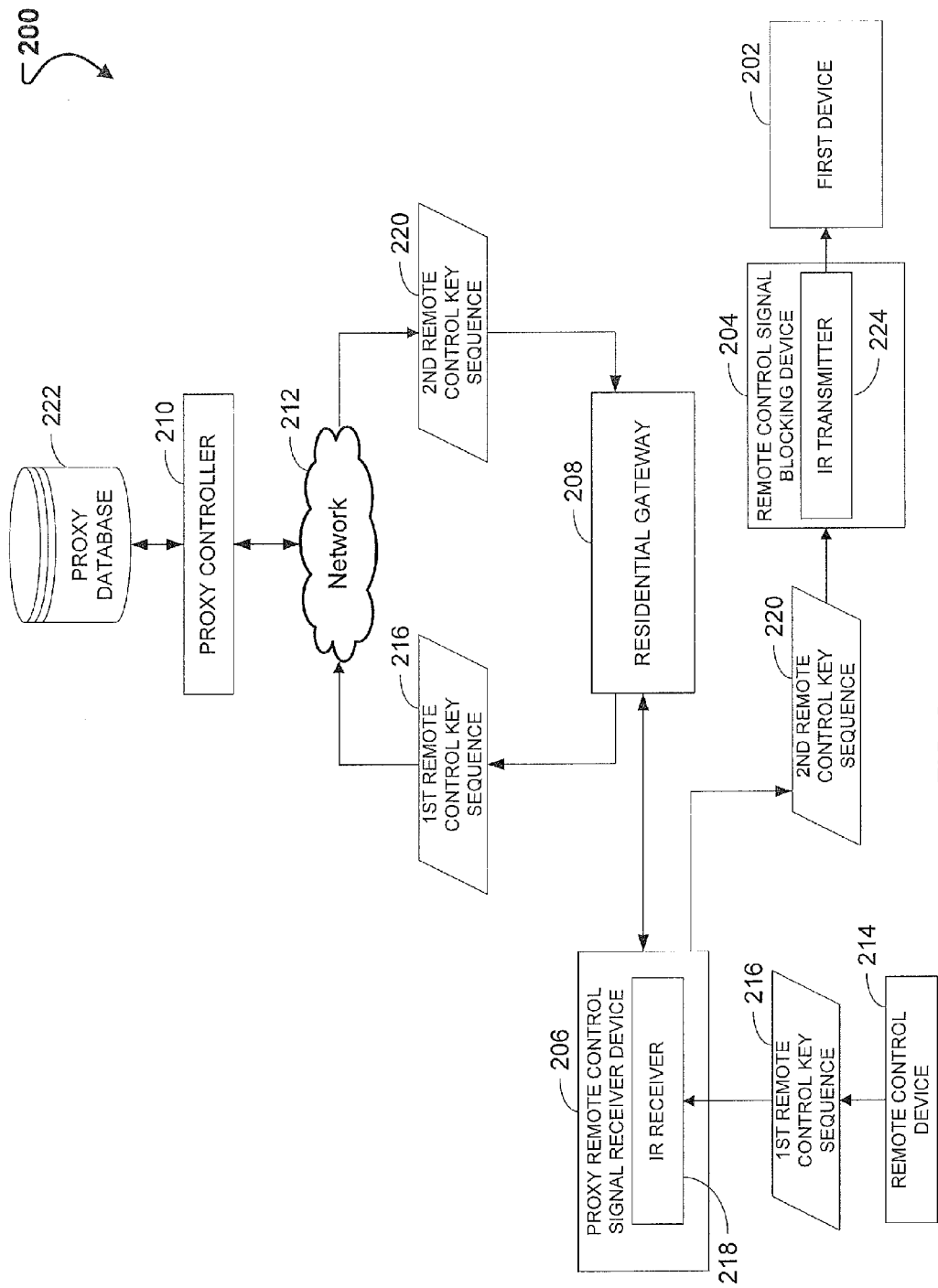
FIG. 2 is a block diagram of a second illustrative embodiment of a proxy remote control system.

Referring to FIG. 2, a second illustrative embodiment of a proxy remote control system is illustrated, at 200. The system 200 includes a first device 202, a remote control signal blocking device 204, a proxy remote control signal receiver device 206, a residential gateway 208, and a proxy controller 210 accessible via a network 212. The remote control signal blocking device 204 prevents remote control data transmitted from a remote control device 214 associated with the first device 202 from being received at the first device 202. By preventing the first device 202 from receiving control data from the remote control device 214, alternative control data retrieved from the proxy controller 210 may be provided to the first device 202 via the proxy remote control signal receiver device 206. The system 200 of FIG. 2 may also allow for proxy remote control of other devices (not shown in FIG. 2) via the remote control device 214. A remote control key sequence received at the proxy remote control signal receiver device 206 may be used to execute alternative actions at the device associated with the remote control device 214 (e.g., the first device 202) and to execute actions at other devices that are not associated with the remote control device 214 (e.g., the second device 114 of FIG. 1). FIG. 2 illustrates that the proxy controller 210 may be remotely located from a customer premises and accessible via the network 212.

In operation, the remote control device 214 transmits a first remote control key sequence 216 to the proxy remote control signal receiver device 206 as a first infrared signal. The remote control signal blocking device 204 prevents the first infrared signal from being received at the first device 202. By preventing the first remote control key sequence 216 from reaching the first device 202, the remote control signal blocking device 204 prevents a first action associated with the first remote control key sequence 216 from being executed by the first device 202. Instead, the first infrared signal including the first remote control key sequence 216 is received at an IR receiver 218 of the proxy remote control signal receiver device 206.

The proxy remote control signal receiver device 206 communicates the first remote control key sequence 216 to the proxy controller 210 via the residential gateway 208. The first remote control key sequence 216 may be communicated to the residential gateway 208 via a wired connection or via a wireless connection. For example, the wired connection may include an Ethernet connection, and the wireless connection may include an 802.11x connection. Alternatively, the proxy remote control signal receiver device 206 may be included within the residential gateway 208.

The proxy controller 210 determines a second remote control key sequence 220 based on the first remote control key sequence 216. For example, the first remote control key sequence 216 may be associated with selection of a standard definition version of a channel (e.g., channel number 11). The second remote control key sequence 220 may be associated with selection of a high definition version of the same channel (e.g., channel number 111). In this case, the proxy controller 210 may access the proxy database 222 to determine the different channel numbers associated with the different versions of the multimedia content. The second remote control key sequence 220 is associated with execution of a second action at the first device 202 that is different from the first action. In the embodiment illustrated in FIG. 2, the second remote control key sequence 220 is determined based on historical data that includes a log of remote control key sequences received from the remote control device 214. The log of remote control key sequences may be stored at a proxy database 222 accessible to the proxy controller 210. The historical data stored at the proxy database 222 may also include a log of remote control key sequences received from multiple remote control devices associated with multiple customer premises.

The log of remote control key sequences stored at the proxy database 222 may indicate that the first remote control key sequence 216 is associated with a subsequent corrected key sequence. For example, a user may be provided a limited amount of time to enter a channel number before the channel number is transmitted to the first device 202 (e.g., a timeout period). The log may indicate that the user often enters a first channel number (e.g., 1 or 11) followed by a second channel number (e.g., 111 or 1111). This may indicate that the user intended to enter a multi-digit channel number (e.g., 111 or 1111) but the timeout period expired before all the digits could be entered. Thus, when the first remote control key sequence 216 includes a first key sequence (e.g., 11), the proxy controller 210 may substitute a second key sequence (e.g., 1111) based on the log. As another example, the log of remote control key sequences may indicate that the user often adjusts the volume during a particular period of time (e.g., early in the morning or late at night). As such, when the first remote control key sequence 216 is received at a particular time, the second remote control key sequence 220 may include the first remote control key sequence 216 along with a key sequence associated with adjusting the volume. Similarly, the log of remote control key sequences may indicate that the user often adjusts the volume when a particular channel is selected (e.g., a music channel). As such, when the first remote control key sequence 216 is associated with the music channel, the second remote control key sequence 220 may include the first remote control key sequence 216 along with a key sequence associated with adjusting the volume.

The proxy remote control signal receiver device 206 receives the second remote control key sequence 220 from the proxy controller 210 via the residential gateway 208 and communicates the second remote control key sequence 220 to the first device 202. In the embodiment illustrated, the second remote control key sequence 220 is communicated to the first device 202 via the remote control signal blocking device 204. In this embodiment, an IR transmitter 224 of the remote control signal blocking device 204 transmits a second IR signal to the first device 202 (i.e., an IR signal that is different from the first IR signal received from the remote control device 214).

FIG. 2 illustrates that the proxy controller 210 may be remotely located with respect to the customer premises of the residential gateway 208. As such, processor and storage requirements may be reduced at the customer premises. Further, when multiple customer premises communicate data to the proxy controller 210 via the network 212, the proxy database 222 may be able to log remote control key sequences from multiple remote control devices. With this information, the network provider may be able to provide more accurate remote control key sequences and may be able to improve the overall customer experience by addressing common issues. In the example above, historical data from multiple customer premises may indicate that it may be common among users to intend to enter a multi-digit channel number with a timeout period expiring before all the digits could be entered. In this case, the network provider may adjust the timeout period for one or more remote control key sequences or may take other remedial measures.

Figure 3:
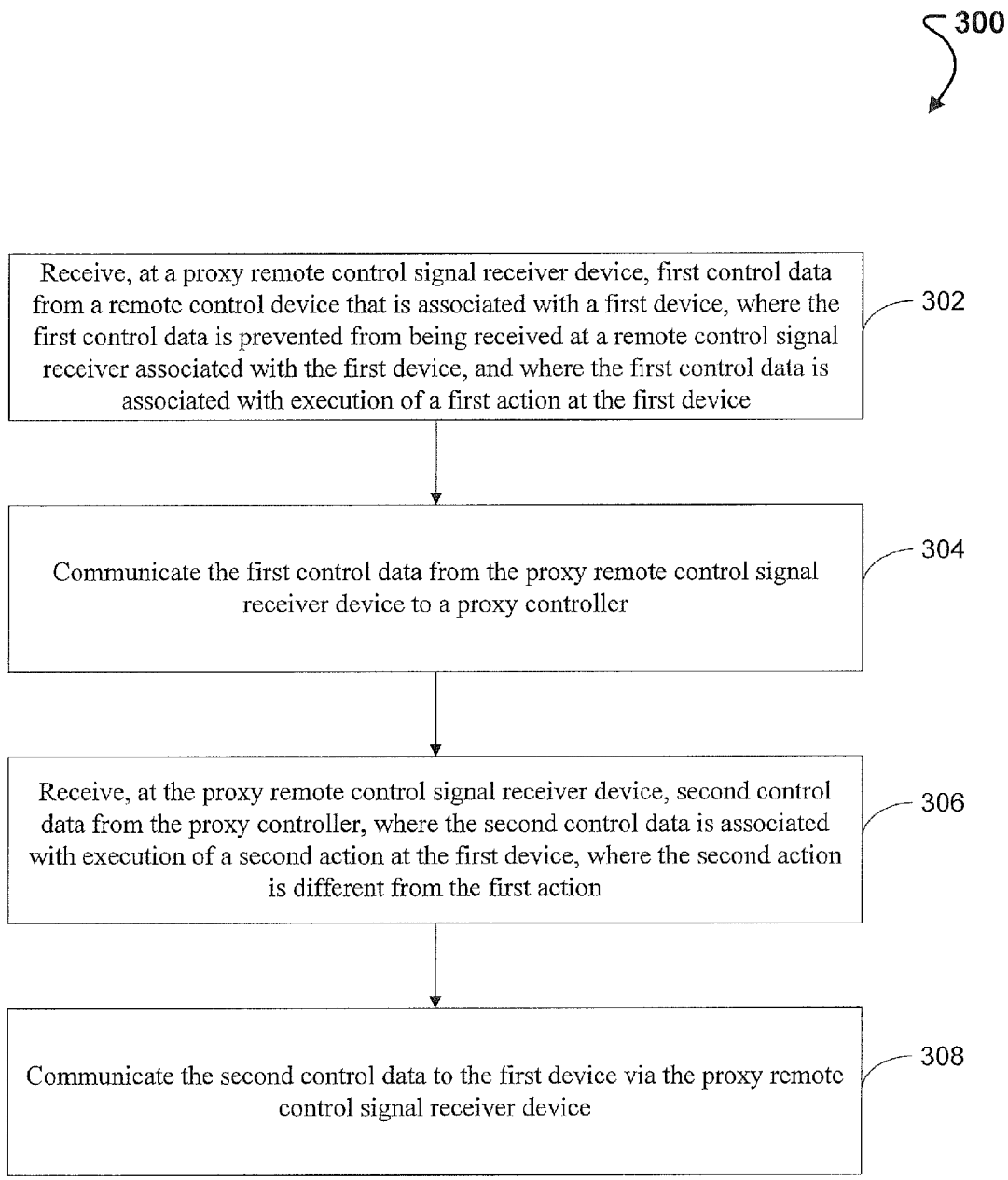
FIG. 3 is a flow chart of a first illustrative embodiment of a method of proxy remote control of a device.

Referring to FIG. 3, a computer-implemented method of proxy remote control of a device is illustrated, at 300. The method includes receiving, at a proxy remote control signal receiver device, first control data from a remote control device that is associated with a first device, at 302. The first control data is prevented from being received at a remote control signal receiver associated with the first device, and the first control data is associated with execution of a first action at the first device. For example, in FIG. 1, the proxy remote control signal receiver device 106 receives the first control data 128 from the remote control device 112 that is associated with the first device 102. The first control data 128 is prevented from being received at the remote control signal receiver 116 associated with the first device 102. The first control data 128 is associated with execution of a first action 122 at the first device 102.

The method includes communicating the first control data from the proxy remote control signal receiver device to a proxy controller, at 304. For example, in FIG. 1, the first control data 128 is communicated from the proxy remote control signal receiver device 106 to the proxy controller 108. In the embodiment illustrated in FIG. 1, the proxy controller 108 is included within the residential gateway 110. Alternatively, the proxy controller may be accessible via a network connection. For example, in FIG. 2, the proxy controller 210 is accessible via the network 212.

The method includes receiving, at the proxy remote control signal receiver device, second control data from the proxy controller, at 306. The second control data is associated with execution of a second action at the first device that is different from the first action. For example, in FIG. 1, the second control data 132 is received at the proxy remote control signal receiver device 106 from the proxy controller 108. The second control data 132 is associated with execution of the second action 124 at the first device 102.

The method includes communicating the second control data to the first device via the proxy remote control signal receiver device, at 308. For example, in FIG. 1, the second control data 132 is communicated to the first device 102 via the proxy remote control signal receiver device 106. In the particular embodiment illustrated in FIG. 1, the second control data 132 is communicated from the proxy remote control signal receiver device 106 to the remote control signal blocking device 104 and from the remote control signal blocking device 104 to the remote control signal receiver device 116 of the first device 102 via an infrared transmission from the IR transmitter 134.

Thus, FIG. 3 illustrates a method of proxy remote control of a device. First control data (e.g., a remote control key sequence) received at a proxy remote control signal receiver device may be used to execute an action at the device that is different from the action associated with the remote control key sequence.

Figure 4:
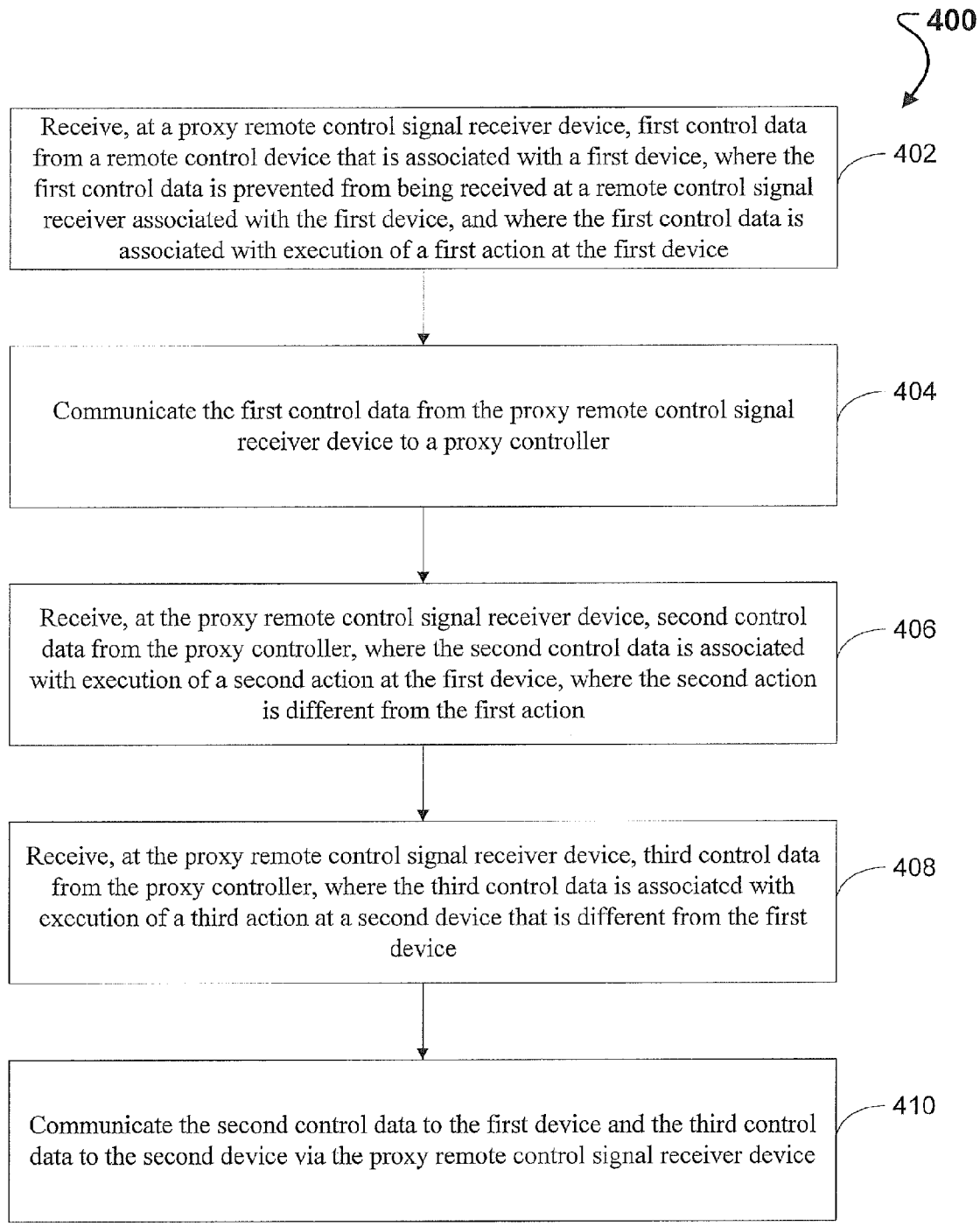
FIG. 4 is a flow chart of a second illustrative embodiment of a method of proxy remote control of a device.

Referring to FIG. 4, a computer-implemented method of proxy remote control of multiple devices is illustrated, at 400. The method includes receiving, at a proxy remote control signal receiver device, first control data from a remote control device that is associated with a first device, at 402. The first control data is prevented (e.g., blocked) from being received at a remote control signal receiver associated with the first device. The first control data is associated with execution of a first action at the first device. The method includes communicating the first control data from the proxy remote control signal receiver device to a proxy controller, at 404. The method includes receiving, at the proxy remote control signal receiver device, second control data from the proxy controller, at 406. The second control data is associated with execution of a second action at the first device that is different from the first action.

The method also includes receiving, at the proxy remote control signal receiver device, third control data from the proxy controller, at 408. The third control data is associated with execution of a third action at a second device that is different from the first device. For example, in FIG. 1, the third control data 136 is received at the proxy remote control signal receiver device 106 from the proxy controller 108. The third control data 136 is associated with execution of the third action 142 at the second device 114.

The method includes communicating the second control data to the first device and the third control data to the second device via the proxy remote control signal receiver device, at 410. For example, in FIG. 1, the second control data 132 is communicated to the first device 102 via the proxy remote control signal receiver device 106, and the third control data 136 is communicated to the second device 114 via the proxy remote control signal receiver device 106.

Thus, the method of FIG. 4 may allow for proxy remote control of multiple devices (e.g., the first device 102 and the second device 114 of FIG. 1) via a single command sequence from a single remote control device (e.g., the remote control device 112). A remote control key sequence received at the proxy remote control signal receiver device 106 may be used to execute alternative actions at the device associated with the remote control device 112 (e.g., the first device 102) and to execute actions at another device that is not associated with the remote control device 112 (e.g., the second device 114).

Figure 5:
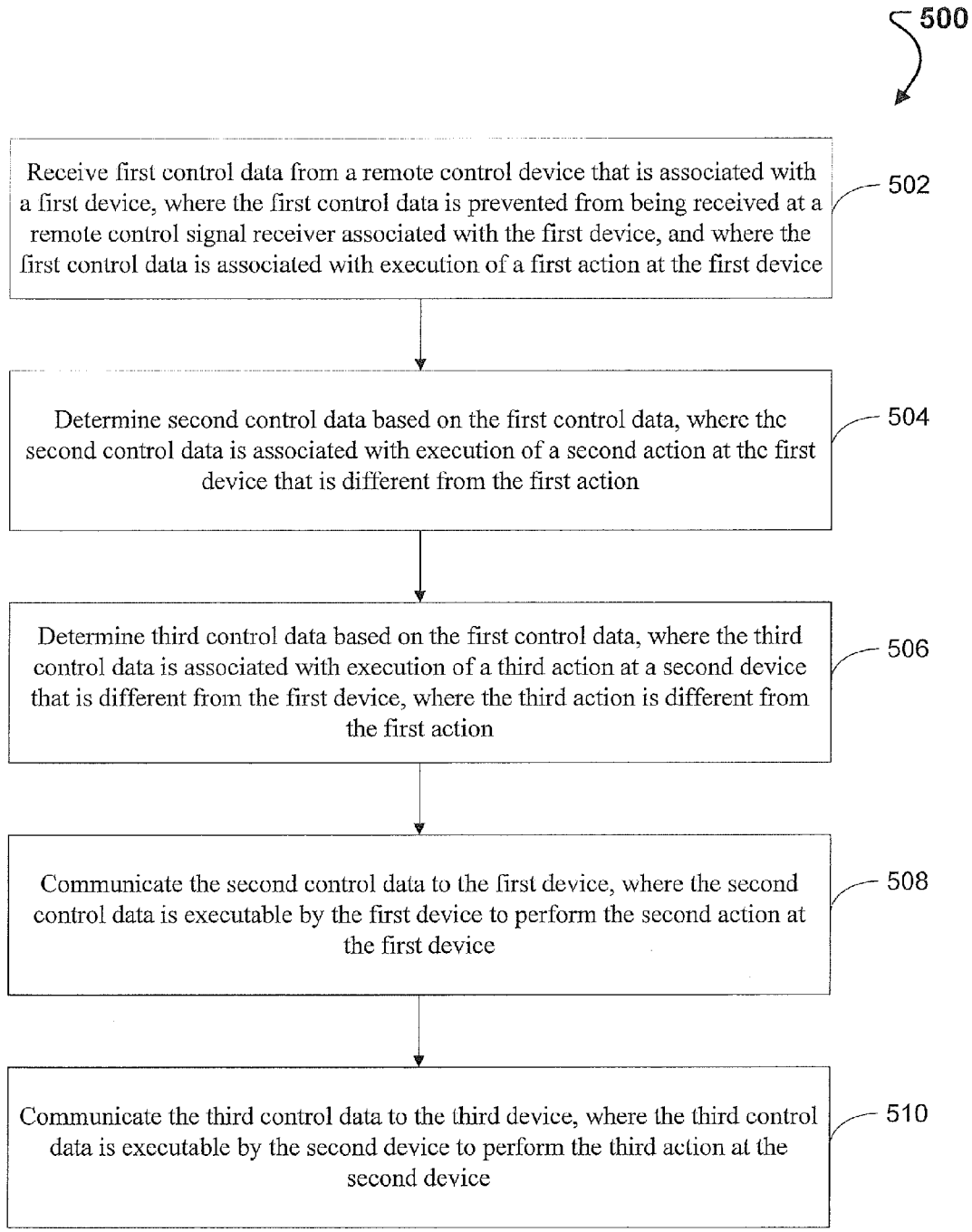
FIG. 5 is a flow chart of a third illustrative embodiment of a method of proxy remote control of a device.

Referring to FIG. 5, another embodiment of a computer-implemented method of proxy remote control of multiple devices is illustrated, at 500. In one embodiment, a computer-readable storage medium stores instructions that, when executed by a processor, cause the processor to execute the method of FIG. 5. For example, the method of FIG. 5 may be executed by the proxy controller 108 of FIG. 1 or by the proxy controller 210 of FIG. 2. In the embodiment illustrated in FIG. 1, the proxy controller 108 is within the residential gateway 110. In the embodiment illustrated in FIG. 2, the proxy controller 210 is remotely located from the residential gateway 208 and is accessible via the network 212. Thus, the method of FIG. 5 may be executed at a proxy controller that is located at the customer premises or that is remotely located from the customer premises.

The method includes receiving first control data from a remote control device that is associated with a first device, at 502. The first control data is associated with execution of a first action at the first device. The first control data is prevented from being received at a remote control signal receiver associated with the first device. For example, in FIG. 1, the first control data 128 is received at the proxy controller 108 from the remote control device 112 that is associated with the first device 102. The first control data 128 is prevented from being received at the remote control signal receiver 116 of the first device 102 by the remote control signal blocking device 104. The first control data 128 is associated with execution of the first action 122 at the first device 102.

The method includes determining second control data based on the first control data, at 504. The second control data is associated with execution of a second action at the first device that is different from the first action. For example, in FIG. 1, the proxy controller 108 determines the second control data 132 based on the first control data 128. The second control data 132 is associated with execution of the second action 124 at the first device 102.

The method includes determining third control data based on the first control data, at 506. The third control data is associated with execution of a third action at a second device that is different from the first device. The third action may be the same as the first action, or the third action may be different from the first action. For example, in FIG. 1, the proxy controller 108 determines the third control data 136 based on the first control data 128. The third control data 136 is associated with execution of the third action 142 at the second device 114. The third action 142 executable by the second device 114 may be the same as the first action 122 executable by the first device 102 or may be different from the first action 122.

The method includes communicating the second control data to the first device, at 508. The second control data is executable by the first device to perform the second action at the first device. For example, in FIG. 1, the proxy controller 108 communicates the second control data 132 to the first device 102 via the proxy remote control signal receiver device 106 and via the remote control signal blocking device 104. The second control data 132 is executable by the first device 102 to perform the second action 124 at the first device 102.

The method includes communicating the third control data to the second device, at 510. The second control data is executable by the second device to perform the third action at the second device. For example, in FIG. 1, the proxy controller 108 communicates the third control data 136 to the second device 114 via the proxy remote control signal receiver device 106. The third control data 136 is executable by the second device 114 to perform the third action 142 at the second device 142.

Thus, the method of FIG. 5 may allow for proxy remote control of multiple devices (e.g., the first device 102 and the second device 114 of FIG. 1) via a single remote control device (e.g., the remote control device 112). The proxy controller 108 may use a remote control key sequence received from the remote control device 112 to determine alternative actions at the device associated with the remote control device 112 (e.g., the first device 102) and to determine actions at another device that is not associated with the remote control device 112 (e.g., the second device 114).

Figure 6:
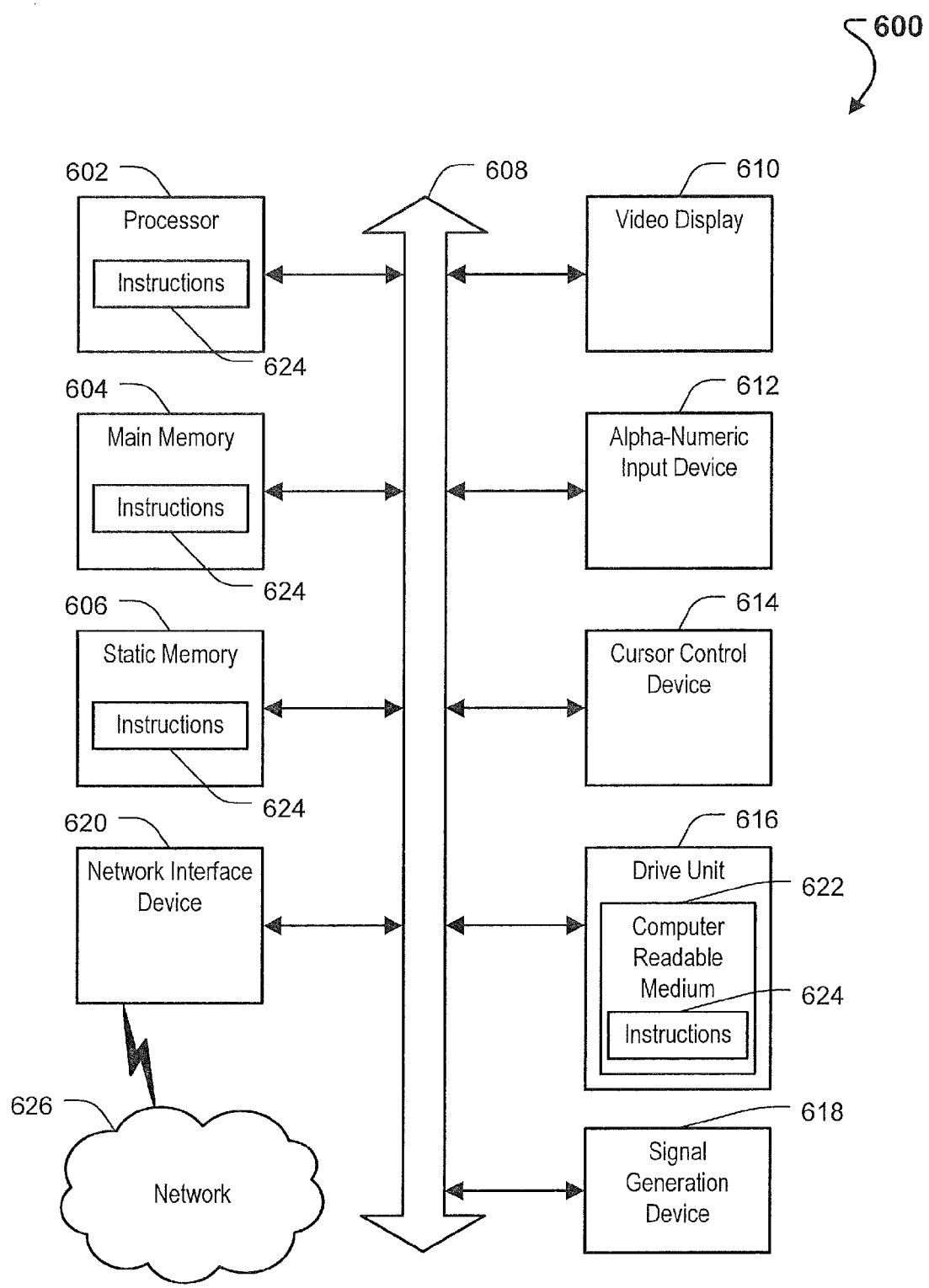
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices.

In a networked deployment, the computer system 600 may operate in the capacity of a set-top box device, a residential gateway, a server, or a mobile computing device. For example, the computer system may include the first device 102 of FIG. 1, the remote control signal blocking device 104 of FIG. 1, the proxy remote control signal receiver device 106 of FIG. 1, the residential gateway 110 of FIG. 1, or the second device 114 of FIG. 1. Further, the computer system may include the first device 202 of FIG. 2, the remote control signal blocking device 204 of FIG. 2, the proxy remote control signal receiver device 206 of FIG. 2, the residential gateway 208 of FIG. 2, the proxy controller 210 of FIG. 2, or the proxy database 222 of FIG. 2.

The computer system 600 can also be implemented as or incorporated into various devices, such as a personal computer (PC), a residential gateway, a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include or be coupled to a video display unit 610, such as a liquid crystal display (LCD), an organic light emitting diode (OLED), a flat panel display, a solid-state display, or a projection display. Additionally, the computer system 600 may include an input device 612, such as a keyboard, a remote control device, and a cursor control device 614, such as a mouse. The computer system 600 can also include a disk drive unit 616, a signal generation device 618, such as a speaker or remote control device, and a network interface device 620. The network interface device 620 may be coupled to other devices (not shown) via a network 626.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, and HTTP) and standards for viewing media content (e.g. MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving first control data at a proxy controller from a proxy remote control signal receiver device, wherein the first control data is associated with execution of a first action at a first device;
   determining second control data at the proxy controller, wherein the second control data is associated with execution of a second action at the first device, wherein the second action is at least one of different from, or additional to, and based upon the first action; and communicating the second control data to the proxy remote control signal receiver device, wherein the proxy remote control signal receiver device is configured to communicate the second control data to the first device.

2. The method of claim 1, wherein the first control data is received at the proxy remote control signal receiver device from a remote control device associated with the first device and wherein the first control data is prevented from being received from the remote control device at a remote control signal receiver associated with the first device.

3. The method of claim 2, wherein first control data is prevented from being received from the remote control device at the remote control signal receiver by a remote control signal blocking device.

4. The method of claim 2, wherein the first control data comprises a first infrared signal transmitted from the remote control device, and wherein the proxy remote control signal receiver device is operable to receive the first infrared signal from the remote control device, and wherein a remote control signal blocking device is operable to prevent the first infrared signal from being received at the first device.

5. The method of claim 4, wherein the second control data is communicated to the first device via the remote control blocking device.

6. The method of claim 5, wherein the remote control signal blocking device transmits the second control data to the remote control signal receiver associated with the first device via a second infrared signal.

7. The method of claim 1, wherein the proxy controller is included within the first device.

8. The method of claim 1, wherein the proxy controller is separate from the first device.

9. The method of claim 8, wherein the proxy controller is included within a residential gateway.

10. The method of claim 9, wherein the proxy remote control signal receiver device communicates with the residential gateway via one of a wired connection and a wireless connection.

11. The method of claim 8, wherein the proxy controller is accessible via a network connection.

12. The method of claim 1, wherein the second control data is determined based on historical data that includes a log of remote control key sequences received from the remote control device.

13. The method of claim 12, wherein the first control data includes a first remote control key sequence and the second control data includes a second remote control key sequence that is determined based on the log of remote control key sequences.

14. The method of claim 13, wherein the log of remote control key sequences indicates that the first remote control key sequence is associated with a subsequent corrected key sequence, and wherein the second remote control key sequence includes the subsequent corrected key sequence.

15. A computer-readable storage device comprising instructions that, when executed by a processor, cause the processor to perform a method, the method comprising:
  receiving first control data at a proxy controller from a proxy remote control signal receiver device, wherein the first control data is associated with execution of a first action at a first device;
  determining second control data at the proxy controller, wherein the second control data is associated with execution of a second action at the first device, wherein the second action is at least one of different from, or additional to, and based upon the first action; and
  communicating the second control data to the proxy remote control signal receiver device, wherein the proxy remote control signal receiver device is configured to communicate the second control data to the first device.

16. The computer-readable storage device of claim 15, wherein the method further comprises:
  determining, at the proxy controller, third control data based on the first control data, wherein the third control data is associated with execution of a third action at a second device that is different from the first device, wherein the third action is different from the first action; and
  communicating the third control data to the proxy remote control signal receiver device, wherein the proxy remote control signal receiver device is configured to communicate the third control data to the second device, and wherein the third control data is executable by the second device to perform the third action at the second device.

17. The computer-readable storage device of claim 16, wherein the first device includes a set-top box device and the second device includes an external digital video recorder that is separate from the set-top box device, and wherein the second action includes recording a multimedia content item at the set-top device and the third action includes recording the multimedia content item at the external digital video recorder.

18. A system comprising:
  a proxy remote control signal receiver device that is operable to:
    receive first control data that is transmitted from a remote control device, wherein the first control data is associated with execution of a first action at a first device;
    communicate the first control data to a proxy controller, wherein the proxy controller determines second control data associated with execution of a second action at the first device, wherein the second action is at least one of different from, or additional to, and based upon the first action;
    receive the second control data from the proxy controller; and
    communicate the second control data to a remote control signal blocking device.

19. The system of claim 18, wherein the system further comprises:
  the remote control signal blocking device that is operable to prevent the first control data that is transmitted from the remote control device from being received at a remote control signal receiver of the first device,
  wherein the remote control signal blocking device communicates the second control data to the first device,
  wherein the first device executes the second action in response to receiving the second control data from the remote control signal blocking device,
  wherein the remote control signal blocking device includes an infrared transmitter, and
  wherein the second control data is communicated to the first device via an infrared transmission from the remote control signal blocking device.

20. The system of claim 18, wherein the system further comprises:
  the remote control signal blocking device that is operable to prevent the first control data that is transmitted from the remote control device from being received at a remote control signal receiver of the first device, wherein the remote control signal blocking device communicates the second control data to the first device, wherein the first device executes the second action in response to receiving the second control data from the remote control signal blocking device, wherein the remote control signal blocking device includes a radio frequency transmitter, and wherein the second control data is communicated to the first device via a radio frequency transmission from the remote control signal blocking device.

\* \* \* \* \*